F. McDONOUGH.
Circular Sawing-Machine.
No. 212,615. Patented Feb. 25, 1879.
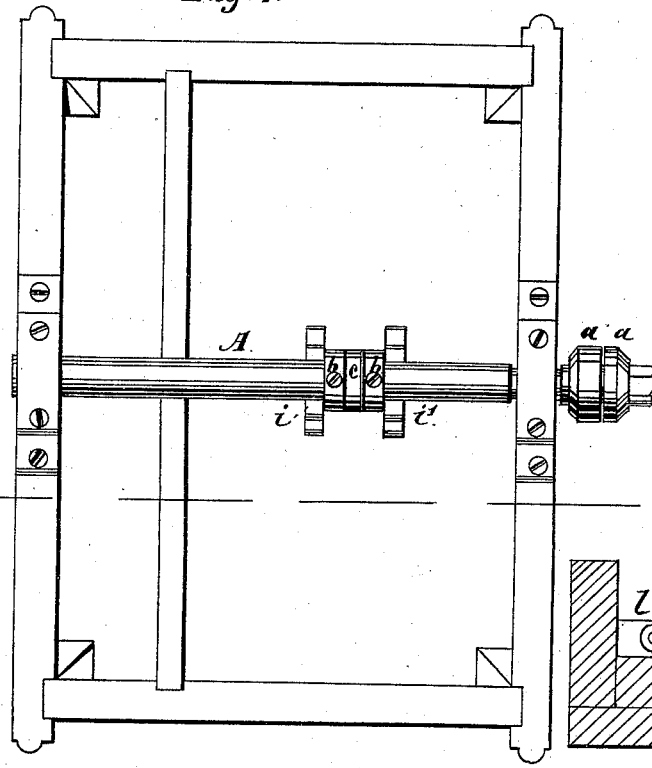
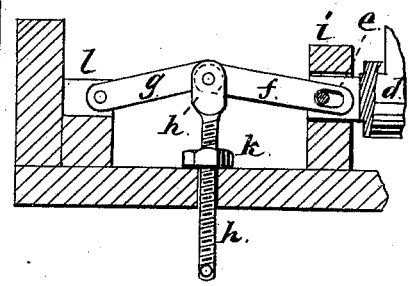
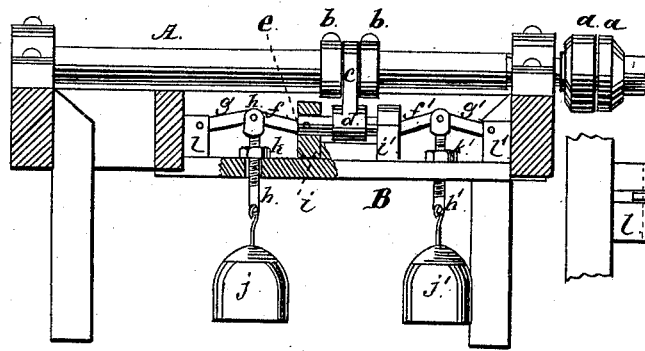
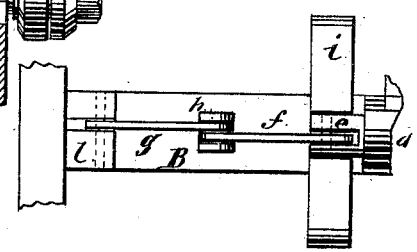
Witnesses:
O. W. Bond
J. G. Polley Jr.
Inventor:
Frank McDonough
By West & Bond Attys.

UNITED STATES PATENT OFFICE.

FRANK McDONOUGH, OF EAU CLAIRE, WISCONSIN.

IMPROVEMENT IN CIRCULAR SAWING MACHINES.

Specification forming part of Letters Patent No. 212,615, dated February 25, 1879; application filed November 29, 1878.

*To all whom it may concern:*

Be it known that I, FRANK McDONOUGH, of Eau Claire, Eau Claire county, State of Wisconsin, have invented a new and useful Improvement in Sawing-Machines, of which the following is a full description, reference being had to the accompanying drawing, in which—

Figure 1 is a plan; Fig. 2, an end elevation, some parts being in section; Figs. 3 and 4, enlarged details.

It has been customary to hold the arbors of circular saws firmly in place by means of collars, and so that the arbor can have no end-play, and it frequently happens that the saw is broken in consequence of "running out" in the log.

The object of my invention is to overcome this difficulty, which I accomplish by giving to the saw-arbor a little end-play, so that if the saw runs out, the arbor or eye of the saw will be adjusted to the cut by the pressure of the log or board against the eye of the saw, and will be returned to its natural position when the saw is not cutting, and will, under ordinary circumstances, be so held that the vibration of the arbor-belt will not cause end-play of the arbor, all by means of devices hereinafter described.

In the drawings, A represents a saw-arbor, which is supported by a frame, as usual. $a\,a$ are collars, between which the saw is secured. The arbor is so constructed that it has a little end-play in its bearings. $c$ is a ring or loose collar upon the arbor, and in which the arbor revolves. It is held so that it cannot slide upon the arbor by means of the set-collars $b\,b$. $d$ is a head upon the ring or collar $c$. $e\,e'$ are round arms extending out from the head $d$, and permanently secured to it. In fact, $c$, $d$, $e$, and $e'$ might be made in one piece. $e\,e'$ are supported in bearings $i\,i'$, and can move longitudinally therein. These bearings $i\,i'$ are supported on a cross-bar, B, connected with the frame. $h$ is a screw, which passes loosely through the bar B, and can be adjusted vertically by means of the nut $k$. $j$ is a weight suspended from the screw $h$. $f\,g$ are two short arms. $f$ is pivoted at one end in a slit in $e$, and the other end is pivoted to the head of the screw $h$. One end of $g$ is pivoted in the head of the screw $h$, and the other end is pivoted to $l$, which is attached to the frame. $f$ is slotted at the end which is connected with $e$.

$f'\,g'\,h'\,j'\,k'\,l'$ are the same as the corresponding parts $f\,g\,h\,j\,k\,l$ on the other side of $d$. The arms $f\,g$ are so arranged as to form a knuckle-joint. When the saw is not cutting, the parts will be in the position shown in Fig. 2, the nuts $k\,k'$ resting on the bar B, and the inner ends of the slots in the arms $f\,f'$ being in contact with the pins to which these arms are pivoted, and the arbor can have a little end-play in either direction.

The weights $j\,j'$ are to be heavy enough to hold the arbor in its natural position under ordinary circumstances, but not so heavy as to prevent its movement when there is considerable pressure upon the saw.

In use, if the saw runs out the log or board presses against the eye of the saw, and when such pressure becomes sufficient to overcome the resistance of one of the weights, $j$ or $j'$, and the friction, then the arbor will move longitudinally in its bearings. For example, suppose the saw runs out so that the pressure comes upon the outside of the saw, (the rim being held firm in guides,) the tendency is to move the eye of the saw and arbor to the left, (looking at Fig. 1,) and when such pressure becomes sufficient, acting through $c\,d\,e$ and the knuckle or toggle joint on the left side, the weight $j$ will be raised and the arbor will move to the left, relieving the eye of the saw from undue strain by adjusting it to the cut. The slot in $f'$ permits the movement of the parts on the left of $d$, as described, without affecting corresponding parts on the right. If the pressure comes on the other side of the saw, then the weight $j'$ will be raised in the same way, and the arbor will move to the right. In either case, when the pressure is removed or ceases, the arbor will be returned to its first position by the action of one of the weights, through the knuckle-joint head $d$ and collar $c$, the arbor moving to the right or left, as the head $d$ and collar $c$ are moved.

I do not limit myself to the exact devices shown for accomplishing the desired result.

Springs might be substituted instead of weights. So the pressure of steam, air, or water might be used to hold the arbor in place and return it after it has moved; but I am now of the opinion that the weight is the most convenient power for this purpose.

It is not necessary to use screws $h\,h'$, as the required adjustment can be secured in some other manner; but the screws and nuts are the most convenient for this purpose.

I have been informed that efforts have been made to use saw-arbors having end-play; but no devices were heretofore used in connection with such an arbor for the purpose of holding it in a given position under ordinary circumstances, and hence the vibration of the arbor-belt caused the arbor to constantly move back and forth, giving a trembling motion to the saw, and causing it to work badly. My devices will hold the arbor firmly in a given position under ordinary circumstances, preventing the vibration of the arbor-belt from giving it any longitudinal movement, the weights or other devices used being sufficient to resist the vibrating action of the belt; but when a greater pressure than the resistance of the weights or other means used is brought against the eye of the saw the arbor can then move longitudinally, and when such pressure ceases the arbor will be restored to and held in its normal position. In this feature is found the essence of my invention, and not simply in constructing the arbor so that it can have end-play.

What I claim as new, and desire to secure by Letters Patent, is as follows:

1. A saw-arbor having end-play, so that the saw can be adjusted to the cut by the pressure of the log or board, in combination with devices adapted to return the arbor to and hold it in its normal position under ordinary conditions, substantially as specified.

2. The saw-arbor A, having end-play, in combination with the collar $c$, connected with the arms $f\,g\,f'\,g'$, substantially as and for the purposes set forth.

3. The arbor A, having end-play, in combination with the collar $c$, having a T-head, arms $f\,g\,f'\,g'$, screws or rods $h\,h'$, and weights $j\,j'$, substantially as and for the purposes set forth.

FRANK McDONOUGH.

Witnesses:
A. R. BERGH,
N. C. WILCOX.